United States Patent
Yamamoto et al.

(10) Patent No.: US 6,716,512 B2
(45) Date of Patent: Apr. 6, 2004

(54) HONEYCOMB STRUCTURE AND PROCESS FOR PRODUCTION THEREOF

(75) Inventors: Yoshinori Yamamoto, Nishikamo-gun (JP); Naomi Noda, Ichinomiya (JP); Takashi Harada, Nagoya (JP)

(73) Assignee: NGK Insulators, Ltd. (JP)

(*) Notice: Subject to any disclaimer, the term of this patent is extended or adjusted under 35 U.S.C. 154(b) by 82 days.

(21) Appl. No.: 09/936,517

(22) PCT Filed: Jan. 11, 2001

(86) PCT No.: PCT/JP01/00078

§ 371 (c)(1),
(2), (4) Date: Oct. 14, 2001

(87) PCT Pub. No.: WO01/53233

PCT Pub. Date: Jul. 26, 2001

(65) Prior Publication Data

US 2002/0180117 A1 Dec. 5, 2002

(30) Foreign Application Priority Data

Jan. 17, 2000 (JP) ........................................ 2000-008288

(51) Int. Cl.⁷ ................................................. B32B 3/12

(52) U.S. Cl. .................... 428/116; 428/188; 428/698; 428/699; 428/701; 428/702; 428/404; 428/407; 428/304.4; 428/332; 428/34.5; 156/89.22; 55/522; 55/523; 422/122; 422/168; 422/177; 422/211; 422/222; 264/43; 264/44; 264/630; 264/628; 264/629; 264/632; 264/656; 264/661; 264/682; 264/177.12

(58) Field of Search .................. 428/116, 188, 428/698, 699, 701, 702, 402, 446, 404, 407, 304.4, 332, 34.4, 34.5; 264/41, 42, 43, 44, 630, 603, 628, 629, 632, 653, 654, 656, 661, 682, 177.12; 156/89.11, 89.22; 55/522, 523; 422/122, 168, 177, 211, 222

(56) References Cited

U.S. PATENT DOCUMENTS

| 4,632,683 | A | * | 12/1986 | Fukutani et al. |
| 4,673,658 | A | * | 6/1987 | Gadkaree et al. |
| 4,777,152 | A | * | 10/1988 | Tsukada |
| 5,322,537 | A | * | 6/1994 | Nakamura et al. |
| 5,766,393 | A | * | 6/1998 | Nishimura et al. |
| 5,780,126 | A | * | 7/1998 | Smith et al. |

FOREIGN PATENT DOCUMENTS

| JP | 4-187578 | | 7/1992 |
| JP | 06-182228 | * | 7/1994 |
| JP | 7-163822 | | 6/1995 |
| JP | 11-92215 | | 4/1999 |

* cited by examiner

Primary Examiner—Deborah Jones
Assistant Examiner—Wendy Boss
(74) Attorney, Agent, or Firm—Parkhurst & Wendel, L.L.P.

(57) ABSTRACT

A honeycomb structure having, in the axial direction, a number of through-channels separated by partition walls, which honeycomb structure contains refractory particles and a vitreous component and is porous. Although the honeycomb structure contains refractory particles such as silicon carbide particles or the like, it can be produced at a relatively low firing temperature; therefore, the honeycomb structure has a low production cost and a high yield and can be provided at a low price.

18 Claims, No Drawings

HONEYCOMB STRUCTURE AND PROCESS FOR PRODUCTION THEREOF

TECHNICAL FIELD

The present invention relates to a honeycomb structure used in a filter for purification of automobile exhaust gas, a catalyst carrier, or the like.

BACKGROUND ART

Porous honeycomb structures are in wide use as a filter for capturing and removing the particulate substance present in a dust-containing fluid (e.g. exhaust gas emitted from diesel engine) or as a catalyst carrier for loading thereon a catalyst component to purify the harmful substances present in an exhaust gas. It is known that as a material constituting such a honeycomb structure, there are used refractory particles such as silicon carbide (SiC) particles or the like.

As a specific technique related thereto, there is disclosed, in, for example, JP-A-6-182228, a porous, silicon carbide-based catalyst carrier of honeycomb structure, obtained by using, as a starting material, a silicon carbide powder having a given specific surface area and a given impurity content, molding the material into a desired shape, drying the molded material, and firing the resulting material at a temperature of 1,600 to 2,200° C.

Meanwhile, there are disclosed, in JP-A-61-26550, a process for producing a vitrifying material-containing refractory, which comprises adding a vitrifying material to an easily oxidizable material or a refractory composition containing an easily oxidizable material, mixing and kneading them together with a binder, molding the kneaded material, and open-firing the molded material in a furnace under a non-oxidative atmosphere; and, in JP-A-8-165171, a silicon carbide molded material obtained by adding, to a silicon carbide powder, an organic binder and inorganic binders of clay mineral series, glass series and lithium silicate series and molding the resulting material.

Also, in JP-A-6-182228 is introduced a process for producing a conventional porous, silicon carbide-based sintered material, which comprises adding, to silicon carbide particles as an aggregate, a binder such as vitreous flux, clay or the like, molding them, and firing the molded material at a temperature at which the binder melts.

Further, there are reported, in JP-B-61-13845 and JP-B-61-13846, the preferred average particle diameter of refractory particles, particle size distribution of refractory particles, porosity of cylindrical material, average pore diameter of cylindrical material, pore volume of cylindrical material, wall thickness of cylindrical material, etc as to a high-temperature use ceramic filter produced by molding refractory particles which consists of silica sand, a ground pottery, a metal oxide such as $Al_2O_3$, $TiO_2$ or $ZrO_2$, silicon carbide, nitride, boride, or other refractory material adjusted to a given grain size, to a porous, bottomed cylindrical material using a refractory binder such as water glass, flit, glaze or the like.

In the sintering (necking between particles) owing to the recrystallization of silicon carbide powder per se, shown in JP-A-6-182228, porosity is obtained but the silicon carbide powder per se is allowed to give rise to recrystallization; therefore, a very high firing temperature need be used which invites a high cost and, moreover, a material of high thermal expansion coefficient need be fired at a high temperature which invites a reduced yield in firing.

Meanwhile, the technique of binding a silicon carbide powder (as a raw material) with a vitreous material, shown in JP-A-61-26550 and JP-A-6-182228 uses a low firing temperature of 1,000 to 1,400° C.; however, the binder once melts during the firing, making it very difficult to obtain a porous material.

Further, the filter shown in JP-B-61-13845 and JP-B-61-13846 is porous but a bottomed cylindrical material having a large wall thickness of 5 to 20 mm: therefore, it was unusable under the condition of high space velocity (SV) experienced by a filter for purification of automobile exhaust gas.

The present invention has been made in view of the above-mentioned situation of the prior art, and is intended to provide a honeycomb structure which contains refractory particles (e.g. silicon carbide particles) and yet can be produced at a relatively low firing temperature at a low cost, which has a sufficiently high porosity and a high specific surface area, and which can be suitably used, for example, as a filter for purification of automobile exhaust gas by a treatment such as plugging of through-channel at its inlet or outlet, or as a catalyst carrier even under a high SV condition.

DISCLOSURE OF THE INVENTION

According to the present invention, there is provided a honeycomb structure having, in the axial direction, a number of through-channels separated by partition walls, which honeycomb structure contains refractory particles and a vitreous component and is porous.

According to the present invention, there is also provided a process for producing a honeycomb structure, which comprises adding a vitrifying material and an organic binder to refractory particles as a raw material, mixing and kneading them to obtain a readily formable bullet, extruding the readily formable bullet into a honeycomb shape, calcinating the extruded material to remove the organic binder contained therein, and then firing the calcinated material.

BEST MODE FOR CARRYING OUT THE INVENTION

The honeycomb structure of the present invention contains refractory particles and a vitreous component binding the refractory particles. Therefore, in its production, a relatively low firing temperature can be used for sintering; a low production cost is made possible; and a high yield can be obtained. The present invention is not directed to a bottomed cylindrical material of thick wall such as disclosed in JP-B-61-13845 or JP-B-61-13846 but directed to a porous honeycomb structure; accordingly, the present honeycomb structure can be used under a high SV condition, as a filter for purification of automobile exhaust gas, a catalyst carrier, or the like.

The honeycomb structure of the present invention preferably has a microstructure wherein the refractory particles are bound by the vitreous component in such a state that the particles used as a raw material for the refractory particles retain their shapes. Also, the honeycomb structure of the present invention preferably has a porosity of 30 to 90% when it is used as a filter for capturing and removing the particulate matter present in a dust-containing fluid. When the porosity of the honeycomb structure is less than 30%, the filtration rate is insufficient; when the porosity is more than 90%, the strength of the structure is insufficient. The porosity is preferably 40% or more when the present honeycomb structure is used in an application for such as for example as a filter for purification of automobile exhaust gas wherein there is a fear of pressure loss.

When the honeycomb structure of the present invention is used also as a filter, the honeycomb structure preferably has an average pore diameter determined depending upon the target substance to be filtered. For example, when the honeycomb structure is used as a diesel particulate filter (DPF) for capturing and removing the particulates contained in the exhaust gas emitted from a diesel engine, the average pore diameter is preferably set at 2 to 50 μm. When the average pore diameter is less than 2 μm, a very large increase in pressure loss appears even when the accumulation amount of particulates is small. When the average pore diameter is more than 50 μm, particulates pass through the DPF. Therefore, such average pore diameters are not preferred.

In the honeycomb structure, the thickness of the partition walls separating the through-channels (cells) is preferably 4 mil or more (102 μm or more). When the thickness of the partition walls is less than 4 mil (102 μm), the honeycomb structure has an insufficient strength. Generally in honeycomb structures, the strength has a close connection with the porosity. In the case of the present honeycomb structure, it was found out that when the thickness of the partition walls is set so as to have the following relationship with the porosity, a required strength is obtained:

$$\text{thickness of partition walls } (\mu m) \geq \text{porosity } (\%) \times 4$$

When the thickness of the partition walls is set so as to have the following relationship with the porosity, a sufficient strength is obtained:

$$\text{thickness of partition walls } (\mu m) \geq \text{porosity } (\%) \times 5$$

Meanwhile, when the present honeycomb structure is used as a filter such as DPF or the like, the thickness of the partition walls is preferably set at 50 mil or less (1,270 μm or less). When the thickness of the partition walls is more than 50 mil (1,270 μm), there are fears of filtration rate shortage and pressure loss increase. The filtration rate and pressure loss of such a filter have close connections with the porosity, and the above fears can be eliminated by setting the thickness of the partition walls so as to have the following relationship with the porosity:

$$\text{thickness of partition walls } (\mu m) \leq \text{porosity } (\%) \times 20$$

The honeycomb structure preferably has a cell density of 5 to 1,000 cells/in.$^2$ (0.7 to 155 cells/cm$^2$). When the cell density is less than 5 cells/in.$^2$ (0.7 cells/cm$^2$), the honeycomb structure has an insufficient strength and, when used as a filter, has an insufficient filtration area. When the cell density is more than 1,000 cells/in.$^2$ (155 cells/cm$^2$), an increase in pressure loss is invited. Therefore, such dell densities are not preferred.

Then, description is made on the process for producing the honeycomb structure of the present invention. In producing the honeycomb structure of the present invention, first, a vitrifying material and an organic binder are added to refractory particles as a raw material, followed by mixing and kneading, to obtain a readily formable bullet.

There is no particular restriction as to the kind of the refractory particles used. However, there are preferably used particles of $ZrO_2$ or $Y_2O_3$ (oxides); SiC (carbide); $Si_3N_4$ or AlN (nitrides); mullite; or the like. In applications such as DPF often exposed to high temperatures during the combustion of accumulated particulates, SiC or the like is preferably used for the high heat resistance.

The refractory particles as a raw material preferably have an average particle diameter of 2 to 4 times the average pore diameter of the honeycomb structure (sintered material) finally obtained in the present process. In the honeycomb structure obtained in the present process, the firing temperature is relatively low and, therefore, the particle shape and particle diameter of the refractory particles used as a raw material are almost retained even after the firing. As a result, when the above ratio is less than 2 times, the particle diameter is too small as compared to the desired pore diameter of the honeycomb structure obtained; consequently, small refractory particles are bound by a vitreous material in a thin and long shape to form large pores, and it is difficult to obtain a structure of high strength which can function as a honeycomb structure of thin walls.

When the refractory particles are, for example, SiC particles and when the SiC are recrystallization SiC conventionally used in porous honeycomb structures, the particles as a raw material for recrystallization SiC need to have, in view of the recrystallization reaction mechanism, about the same particle diameter as the desired pore diameter of the honeycomb structure obtained. In contrast, in the case of the SiC particles bound by a vitreous component, as in the honeycomb structure of the present invention, their particle diameter may be 2 times or more the pore diameter of the honeycomb structure; therefore, in order to obtain the same desired pore diameter, a raw material (SiC particles) of larger diameter (i.e. lower cost) than the raw material of recrystallization SiC can be used, resulting in a large cost merit.

When the above ratio is more than 4 times, the diameter of the refractory particles used is too large as compared with the desired pore diameter and it is difficult to obtain pores of desired diameter between the refractory particles even by packing the refractory particles closely during the molding. Further, a reduction in porosity is incurred when using the obtained honeycomb structure as a filter. Thus, such a ratio is not preferred.

The impurities contained in the refractory particles as a raw material invite a reduction in softening point of vitrifying material and have an adverse effect on the result of sintering. Therefore, the content of the impurities is preferably controlled at 5% by weight or less. The content of, in particular, alkali metals and alkaline earth metals has a large influence on the reduction in softening point and accordingly is preferably controlled at 1% by weight or less.

There is no particular restriction as to the kind of the vitrifying material as long as it melts at 1,000° C. or more and can form a vitreous material. The vitrifying material may be, for example, a material which is not vitreous when mixed with refractory particles, etc., is composed of at least one kind of oxide or the like selected from vitrifying materials such as $SiO_2$, $Al_2O_3$, $B_2O_3$, $Na_2O$, $LiO_2$, MgO, $K_2O$, CaO and the like, and melts with each other and becomes a vitreous material during the firing step, or may be a flit type material which is vitreous per se.

The former material has a merit in that when composed of a plurality of oxides or the like, the melting temperature range can have a width and it is possible to avoid quick melting and viscosity reduction. The latter material has a merit in that the melting temperature range can be restricted and therefore the firing conditions can be set easily. Further, the vitrifying material useable in the present process includes even a vitrifying material containing not only a material which becomes a complete vitreous material after firing but also a material which is converted into a crystalline material (e.g. crystallized glass) through a crystallization step after melting. There are also suitably used a clay, a water glass, a glaze, etc. as long as they perform the same role.

The vitrifying material has a role of melting during firing, covering the surface of refractory particles and binding the particles. Therefore, the adequate amount of the vitrifying material used has a close connection with the surface area of the refractory particles. Here, the surface area of the refractory particles differs depending upon the shape, etc. of the refractory particles; however, since the vitrifying material melts and adheres to the refractory particles, it is generally appropriate that the surface area of the refractory particles is taken as the geometrical surface area [$S=4\pi r^2$(r is an average particle radius of refractory particles)] when each refractory particle is regarded as a sphere and not taken as the BET specific surface area. By using this geometrical surface area [$S=4\pi r^2$], "vitrifying material amount W per unit surface area of refractory particles" can be easily calculated form the following formula:

$$W=[(4/3\pi r^3 \times \rho)/(\text{weight proportion of refractory particles})]\times [(\text{weight proportion of vitrifying material})/(4\pi r^2)]$$

(wherein r is the average radius of refractory particles and $\rho$ is the specific gravity of refractory particles).

In the process of the present invention, the amount of the vitrifying material added is preferably determined so that the "vitrifying material amount W per unit surface area of refractory particles" becomes 3 to 30 g/m$^2$. When the W is less than 3 g/m$^2$, the amount of the binder is insufficient and it is impossible to obtain a thin-wall structure (e.g. a honeycomb structure) having a strength sufficient for retaining its shape. When the W is more than 30 g/m$^2$, the vitreous material is present in an amount larger than necessary for appropriately binding the refractory particles; therefore, although an increased strength is obtained, there appear demerits such as reduction in porosity, reduction in average pore diameter, and the like.

The average particle diameter of the vitrifying material is preferably 50% or less of the average particle diameter of the refractory particles which are an aggregate. The vitrifying material melts upon firing, combines between its particles, and covering the surface of the refractory particles; therefore, when the particle diameter thereof is more than 50% of the particle diameter of the refractory particles, the spaces occupied by the vitrifying material particles become large voids during molding, which invites an reduction in strength; when the honeycomb structure obtained is used as a filter, a reduction in filtrability, i.e. leakage during filtration takes place.

In general, extrusion of honeycomb structure can be conducted smoothly by using a mixture of two or more kinds of material powders different in grain sizes. From this standpoint, the average particle diameter of the vitrifying material is preferably 30% or less of the average particle diameter of the refractory particles which are an aggregate.

In order to extrude the bullet smoothly, into a honeycomb shape, a readily formable bullet obtained by compounding refractory particles (an aggregate), a vitrifying material and, as necessary, a pore forming material, etc., it is preferred to add at least one kind of organic binder in order to extrude the bullet smoothly, in an amount of 2% by weight or more based on the total amount of the main raw materials (the refractory particles and the vitrifying material). However, addition of the organic binder in an amount of more than 30% by weight is not preferred because it invites too high a porosity after calcination (this leads to an insufficient strength).

The organic binder is added in an amount of preferably 4 to 20% by weight when a honeycomb structure having a partition wall thickness of 20 mil (508 μm) or less is extruded. When the addition amount is less than 4% by weight, extrusion in such a thin wall is difficult. When the addition amount is more than 20% by weight, the extruded material is difficult to retain its shape.

When the honeycomb structure is used as a filter, a pore forming material may be added at the time of producing a readily formable bullet, in order to obtain a higher porosity. The amount of the pore forming material added is preferably 30% by weight or less based on the total amount of the main raw materials (the refractory particles and the vitrifying material). When the amount is more than 30% by weight, too high a porosity and an insufficient strength are incurred. The average particle diameter of the pore forming material is preferably 25 to 100% of the desired average pore diameter to be obtained after firing, because pores are formed at the sites where the hole-making agent has burnt and disappeared.

The above-mentioned raw materials are mixed and kneaded by an ordinary method to form a readily formable bullet, and the bullet is formed into a desired honeycomb shape by extrusion formed or the like. The formed material is calcinated to remove (debind) the organic binder contained in the formed material, followed by firing. The calcination is conducted preferably at temperatures lower than the temperature at which the vitrifying material melts. Specifically, the calcination may be carried out by keeping at a predetermined temperature between about 150 and 700° C. tentatively, or by using a small temperature elevation rate of 50° C./hr or less within a predetermined temperature range.

When the calcination is carried out by keeping at a predetermined temperature tentatively, one may keep tentatively the temperature at a single level or a plurality of levels, depending upon the kind and amount of the organic binder used and; in the latter case of keeping the temperature at a plurality of the levels, the keeping time at the temperatures may be the same or different. When the calcination is conducted by using a small temperature elevation rate, the small temperature elevation rate may be used in a single temperature range or in a plurality of temperature ranges and, in the latter case, the temperature elevation rates used may be the same or different.

The atmosphere used in the calcination may be an oxidizing atmosphere. However, when a large amount of an organic binder is contained in the formed material, it may be ignited by oxygen during the calcination and thereby the formed material temperature may be increased rapidly; therefore, the calcination may preferably be conducted in an inert atmosphere (e.g. $N_2$ or Ar) to suppress the abnormal temperature rise of formed material. This suppression of abnormal temperature rise is important when raw materials having large thermal expansion coefficients (low thermal impact resistances) are used. When an organic binder is used in an amount of, for example, 20% by weight or more based on the total amount of the main raw materials, it is preferred to conduct calcination in the above-mentioned inert atmosphere.

Calcination and subsequent firing may be conducted as independent steps in the same furnace or in different furnaces, or may be conducted as a continuous step in the same furnace. The former operation is preferred when calcination and firing are conducted in different atmospheres: and the latter operation is preferred from the standpoint of total time of calcination and firing, running cost of furnace, etc.

] The temperature employed in the firing differs depending upon the kind of the vitrifying material used but is ordinarily preferred to be 1,000 to 1,600° C. When the temperature of the firing is less than 1,000° C., the vitrifying material does not melt sufficiently and the refractory particles are not bound to each other strongly. When the temperature is more than 1,600° C., the molten vitrifying material has too low a viscosity and concentrates locally at about the surface of the fired material or at the bottom of the fired material. Therefore, such firing temperatures are not preferred.

Preferably, the atmosphere used in the firing is selected depending upon the kind of the refractory particles used. When the refractory particles are those having a fear of oxidation at high temperatures, such as carbide particles (e.g. SiC), nitride particles typified by $Si_3N_4$ or AlN, and the like, it is preferred to use a non-oxidizing atmosphere (e.g. $N_2$ or Ar) at least in a temperature range where oxidation takes place.

The present invention is described in detail below by way of Examples. However, the present invention is in no way restricted to these Examples.

EXAMPLE 1

There were uniformly mixed and kneaded 85 parts by weight of a SiC powder having an average particle diameter of 50.0 μm, 15 parts by weight of a vitrifying material having an average particle diameter of 10.8 μm, 6 parts by weight of methyl cellulose as an organic binder, 5 parts by weight of graphite as a pore forming material, 2.5 parts by weight of a surfactant and 24 parts by weight of water, to obtain a readily formable bullet. The bullet was extruded into a honeycomb shape having an outer diameter of 45 mm, a length of 120 mm, a partition wall thickness of 0.43 mm and a cell density of 100 cells/in.$^2$ (16 cells/cm$^2$) using an extruder. This honeycomb extruded material was subjected to calcination for degreasing at 550° C. for 3 hours in an oxidizing atmosphere, followed by firing at 1,400° C. for 2.5 hours in a non-oxidizing atmosphere, to produce a SiC sintered material of porous honeycomb structure. This sintered material was measured for average pore diameter and porosity by a mercury porosimeter and further for three-point bending strength. The results are shown in Table 1.

Incidentally, the three-point bending strength was calculated using the following formula:

$$\sigma = (F \times S)/(4 \times Z)$$

(wherein σ is a three-point bending strength, F is a load, S is a lower span distance (35 mm), and Z is a sectional secondary moment).

EXAMPLE 2

A sintered material was obtained by conducting the same kneading, extruding and firing as in Example 1 except that the SiC powder was changed to a SiC powder having an average particle diameter of 32.6 μm. The sintered material was measured for average pore diameter, porosity and three-point bending strength in the same manners as in Example 1. The results are shown in Table 1.

EXAMPLE 3

A sintered material was obtained by conducting the same kneading, extruding and firing as in Example 1 except that the amounts of the SiC powder and the vitrifying material were changed to 70 parts by weight and 30 parts by weight, respectively. The sintered material was measured for average pore diameter, porosity and three-point bending strength in the same manners as in Example 1. The results are shown in Table 1.

EXAMPLE 4

A sintered material was obtained by conducting the same kneading, extruding and firing as in Example 1 except that the SiC powder was changed to a SiC powder having an average particle diameter of 32.6 μm and the amounts of the SiC powder and the vitrifying material were changed to 65 parts by weight and 35 parts by weight, respectively. The sintered material was measured for average pore diameter, porosity and three-point bending strength in the same manners as in Example 1. The results are shown in Table 1.

EXAMPLE 5

Honeycomb structures each having a larger diameter than that of the honeycomb structures of Examples 1 to 4 were produced. Also, honeycomb structures were produced each using a readily formable bullet containing the same organic binder in a larger amount than in Examples 1 to 4. When these honeycomb structures were calcinated for debinding in an oxidizing atmosphere in the same manner as in Examples 1 to 4, there could be obtained sintered materials having the same properties as in Examples 1 to 4, at a yield of 90% or more. When the above honeycomb structures were calcinated in an inert atmosphere, there was no cell breakage or the like and there could be obtained good sintered materials at a zero percent defective.

TABLE 1

|  | Av. particle diameter of SiC powder (μm) | Amount of SiC powder used (wt. parts) | Amount of vitrifying material used (wt. parts) | Av. pore diam. (μm) | Porosity (%) | Strength (kgf/mm$^2$) | (Av. particle diam. of sic powder)/(av. pore diam. of sintered material) | (Amount of vitrifying material used)/ (surface area of SiC powder |
|---|---|---|---|---|---|---|---|---|
| Ex. 1 | 50.0 | 86 | 15 | 16.6 | 43.2 | 2.59 | 3.01 | 9.18 |
| Ex. 2 | 32.6 | 85 | 15 | 10.3 | 48.4 | 2.28 | 3.17 | 5.98 |
| Ex. 3 | 50.0 | 70 | 30 | 19.5 | 30.9 | 4.36 | 2.56 | 22.29 |
| Ex. 4 | 32.6 | 65 | 35 | 13.0 | 38.6 | 5.39 | 2.51 | 18.26 |

As is clear from the above results, in order to obtain a honeycomb structure having an intended average pore diameter, the particle diameter of the SiC powder used as a raw material for the honeycomb structure can be selected easily. Further, the amount of the vitrifying material used also as a raw material can be determined at an appropriate level. Thus, an intended honeycomb structure can be produced at a low cost.

INDUSTRIAL APPLICABILITY

As described above, the honeycomb structure of the present invention contains refractory particles such as SiC particles or the like and yet, in its production, sintering can be conducted at a relatively low temperature; therefore, its production cost can be suppressed at a low level, its yield is high, and a product of low price can be provided. Further, being porous, the present honeycomb structure can be suitably used even under a high SV condition, as a filter for purification of automobile exhaust gas, a catalyst carrier, or the like.

What is claimed is:

1. A honeycomb structure having, in the axial direction, a number of through-channels separated by partition walls, characterized in that honeycomb structure contains refractory particles and a vitreous component and is porous, wherein the refractory particles are bound by the vitreous component in such a state that the particles used as a raw material for the refractory particles retain their shapes, and wherein the thickness of the partition walls and the (porosity of the honeycomb structure satisfy the following relationships:

thickness of partition walls ($\mu$m) $\geq$ porosity (%) $\times 4$ and thickness of partition walls ($\mu$m) $\leq$ porosity (%) $\times 20$.

2. A honeycomb structure according to claim 1, wherein the refractory particles are silicon carbide particles.

3. A honeycomb structure according to claim 1, which is used as a filter for capturing and removing the particulate matter present in a dust-containing fluid.

4. A honeycomb structure according to claim 1, which has a porosity of 30 to 90%.

5. A honeycomb structure according to claim 1, which has an average pore diameter of 2 to 50 $\mu$m.

6. A honeycomb structure according to claim 1, wherein the partition walls have a thickness of 102 to 1,270 $\mu$m.

7. A honeycomb structure according to claim 1, wherein the thickness of the partition walls and the porosity of the honeycomb structure satisfy the following relationship:

thickness of partition walls ($\mu$m) $\geq$ porosity (%) $\times 5$.

8. A honeycomb structure according to claim 1, which has a through-channels density of 0.7 to 155 cells/cm$^2$.

9. A process for producing a honeycomb structure, characterized by adding a vitrifying material and an organic binder to refractory particles as a raw material wherein the vitrifying material is added in an amount of 3 to 30 g per m$^2$ of the surface area of the refractory particles, mixing and kneading them to obtain a readily formable bullet, forming the readily formable bullet into a honeycomb shape material, calcinating the honeycomb shaped material to remove the organic binder contained therein, and then firing the calcinated material to obtain a porous honeycomb structure.

10. A process according to claim 9 wherein the refractory particles as a raw material is silicon carbide particles.

11. A process according to claim 9, wherein the refractory particles as a raw material has an average particle diameter of 2 to 4 times the average pore diameter of the honeycomb structure obtained finally.

12. A process according to claim 9, wherein the refractory particles as a raw material contain impurities in an amount of 5% by weight or less.

13. A process according to claim 9, wherein the vitrifying material contains at least one kind of oxide selected from the group consisting of $SiO_2$, $Al_2O_3$, $B_2O_3$ and $Na_2O$.

14. A process according to claim 9, wherein the vitrifying material has an average particle diameter of 50% or less of the average particle diameter of the refractory particles as an aggregate.

15. A process according to claim 9, wherein the organic binder is added in an amount of 2 to 30% by weight relative to the total amount of the refractory particles as a raw material and the vitrifying material.

16. A process according to claim 9, wherein while mixing and kneading the raw material to obtain the readily formable bullet, adding a pore forming material in an amount of 30% by weight or less relative to the total amount of the refractory particles as a raw material and the vitrifying material.

17. A process according to claim 9, wherein the calcination of the molded material is carried out at a temperature lower than the melting temperature of the vitrifying material.

18. A process according to claim 9, wherein the firing is carried out at a temperature between 1,000 and 1,600° C.

* * * * *

UNITED STATES PATENT AND TRADEMARK OFFICE
CERTIFICATE OF CORRECTION

PATENT NO. : 6,716,512 B2
DATED : April 6, 2004
INVENTOR(S) : Yoshinori Yamamoto et al.

It is certified that error appears in the above-identified patent and that said Letters Patent is hereby corrected as shown below:

<u>Title page,</u>
Item [86], 371 (c)(1)(2)(4) Date: change "Oct. 14, 2001" to -- Sept. 14, 2001 --.

Signed and Sealed this

Twenty-fifth Day of May, 2004

JON W. DUDAS
*Acting Director of the United States Patent and Trademark Office*